United States Patent [19]

Gibson et al.

[11] 4,180,407
[45] Dec. 25, 1979

[54] INK FOR APPLICATION TO UNGLAZED PAPER SURFACES

[76] Inventors: Donald M. Gibson, 1175 Clarendon Cres., Oakland, Calif. 94610; Donald C. Pierce, 59 Reposa Vista, Novato, Calif. 94947

[21] Appl. No.: 942,824

[22] Filed: Sep. 15, 1978

Related U.S. Application Data

[63] Continuation of Ser. No. 783,500, Mar. 28, 1977, abandoned.

[51] Int. Cl.$^2$ .................... C09D 11/20; C09D 11/14; C09D 11/08; C09D 11/04
[52] U.S. Cl. ............................... 106/26; 106/22; 106/23; 106/30; 106/290; 260/29.6 B
[58] Field of Search ............... 106/30, 22, 26, 23; 156/277; 162/134; 8/25; 260/29.6 B

[56] References Cited

U.S. PATENT DOCUMENTS

| | | | |
|---|---|---|---|
| 3,010,833 | 11/1961 | Cataldo | 106/26 |
| 3,891,581 | 6/1975 | Argenio | 260/16 |

*Primary Examiner*—Carman J. Seccuro
*Attorney, Agent, or Firm*—Owen, Wickersham & Erickson

[57] ABSTRACT

Ink which is especially suitable for application to or for drawing lines on unglazed or porous surfaces is an aqueous suspension of an opaque, water-insoluble powdered pigment, containing also a binder which forms a flexible film upon drying, and a small amount of surfactant and, if desired, a fungicide.

15 Claims, No Drawings

INK FOR APPLICATION TO UNGLAZED PAPER SURFACES

This is a continuation of application Ser. No. 783,500, filed Mar. 28, 1977, now abandoned.

BACKGROUND OF THE INVENTION

This invention relates to an ink for use on cardboard picture mats and other unglazed paper surfaces; and more particularly to a pigment-containing ink especially useful in providing uniform, permanent lines on such paper surfaces whether colored or white.

Many inks are known which are quite satisfactory for drafting purposes or for drawing lines on any type of glazed or hard-finished paper. In such use, absorption and bleeding or spreading of the ink can be well controlled. However, in drawing lines on unglazed paper or paper having a more open, fibrous surface, problems of spreading or of adherence and permanence arise. The stock not only absorbs the ink inwardly from the surface but along the surface or perpendicular thereto as well.

The present invention provides an ink which is excellent for use on such unglazed paper surfaces. This ink is especially suitable for use in a ruling pen and when so used forms a line of constant width without buildup at start or finish. The ink comprises pigments which are permanent, so that it does not fade after application which is important in colored lines in picture-framing, for instance. This ink has the further advantage that it does not bleed or spread out, even when applied to such a porous surface as 100% rag paper. It is also an advantage in practice that the ink comprises a water vehicle so that the pen or brush which has been used to apply the ink can be cleaned with water. Thus, there are numerous advantages in that the solvent portion of the vehicle of the present composition is water, water being economical, readily available, nontoxic, not harmful to the handler and nonflammable.

The ink of this invention is excellently adapted to use in a ruling pen, but it can also be applied in other desired ways, for instance by brushing. The ink is opaque as applied, is scuff-resistant, and provides a uniform ruled line. In using the ink, if the pigment settles the ink is mixed or agitated to make a uniform suspension, but due to the particle size and the viscosity of the ink, the pigment, except for the gold ink, stays in suspension for a considerable time after agitation. The gold ink, however, because of the high specific gravity of the bronze pigment and the larger particle size, would require frequent agitation. The surface tension is of a value to hold a charge of ink in a ruling pen and to prevent the ink from spreading out when applied to a porous surface such as blotter or high quality porous papers. On the other hand, if the surface tension were too high, the ink would not flow out of the pen at all, and if too low the ink tends to drip out of a ruling pen, for instance. The desirable surface tension, therefore, is advantageously from 50 to 60 dynes per cm for satisfactory operation. The opacity of the dried ink is advantageous over the inks which use water- or spirit-soluble dyes because, in part, the opacity produces a more solid looking line. This provides more definition in drawn lines, for example, in picture framing. A primary advantage of pigment over dye is that the pigments we use are permanent. We have found that even the best commercially available dye-based inks fade considerably when lines drawn with them are exposed to sunlight through a window for as little as three days, whereas the pigments used in this invention do not fade.

SUMMARY OF THE INVENTION

The ink of the present invention comprises a suspension of finely divided, water-insoluble, opaque pigment in an aqueous solution of an organic binder and a small amount of surfactant. It is also advantageous that the suspension may contain a small amount of fungicide effective to prevent bacterial degradation of the organic binder of the ink. For instance, about 0.2% by weight of fungicide is suitable.

The composition comprises from about 3% to about 13% by weight of the water-insoluble pigment of particle size passing through a 325 mesh screen and of from 0.1 to 5.0 micron size in at least one dimension. An excellent ink according to this invention comprises pigment particles which are predominantly (typically 90%) in the range of from 0.1 to 5.0 micron size and being uniformly of such size range. The ink composition also comprises from 2.5% to 4.0% by weight of an organic binder, a small amount of surfactant and a small amount of fungicide, the remainder being essentially water, i.e., 83–93% water. In an especially useful embodiment the ink composition has a surface tension of from 50 to 60 dynes per cm.

The pigment employed herein may be any reliable colored, white, black or metallic pigment. Any water-insoluble, non-fading, nontoxic opaque powdered substance of the particle size described, which can be organic or inorganic, natural or synthetic, can be employed as pigment. The pigment useful herein includes, but is not limited to, red, yellow and black iron oxides, green chromium oxide, ultramarine blue, titanium dioxide and carbon black. For gold inks, I use extra fine, i.e., 100% through 325 mesh, non-tarnishing bronze powder. Such powder is in flat flakes which may be over 5 microns in length and width, e.g., up to 40 microns, but are only about 4 microns in thickness. When such gold ink is deposited on a paper surface, these flakes overlap and provide the gold metallic luster. Mixtures of the pigments with each other in any desired ratio to give a desired color effect can also be employed.

The binder useful in the present invention is a water-soluble organic compound or substance which, upon drying and in the proper amount, forms a flexible film, binds the pigment particles so that they do not rub or scuff off and adheres to the paper base. The binder provides desired non-spreading properties and also provides the desired viscosity. A preferred binder is hydroxy ethyl cellulose (HEC), and it is advantageous because it is an excellent binder and also it provides an ink of the proper body or viscosity. Hydroxy ethyl cellulose, methyl cellulose and carboxymethyl cellulose (as the sodium salt) are each commercially available in several different grades of viscosity so that a grade can be easily selected to provide the desired amount of binder at the desired viscosity.

In the manufacture of HEC, for instance, cellulose is reacted with sodium hydroxide to produce a swollen alkali cellulose. By reacting the alkali cellulose with ethylene oxide, a series of hydroxyethyl cellulose ethers are produced. The solution viscosity of the hydroxyethyl cellulose can be varied over a wide range by changing the molecular weight of the cellulose backbone.

Other binders which can be used in this invention include partially alkylated cellulose, that is, water-soluble cellulose ethers and esters; carbohydrates such as starch, sugar, dextrose, alginates; polysaccharides such as xanthan gum; proteins such as gelatine, glue, casein and zein; natural resins and gums such as ghatti, locust bean, carrageenan, tragacanth, karaya, arabic; high molecular weight polyethylene glycols and chlorinated derivatives thereof; and water-soluble resinous materials such as polyvinyl alcohol and numerous others.

Viscosity and surface tension are both factors in determining the suitable rheological properties of this ink. To determine the suitability of a binder, the following steps can be followed:
1. Determine the binder level needed to bind the pigment to the paper and provide a film tough enough to resist scuffing.
2. Adjust viscosity so that the pigment holds in suspension while the ink is being used.
3. Further adjust viscosity and surface tension so that:
   a. An adequate charge of ink will hold in the pen without dripping out (adequate to draw, for instance, a 1/16" line of 30 inches length); and yet the ink must flow out of the pen readily when a line is being drawn.
   b. The ink will not spread and feather out when applied to a porous paper surface.

If the ink is somewhat too viscous at the desired binder level, addition of a soluble inorganic salt might reduce viscosity adequately and if the viscosity is too low a thickener can be added.

The surfactant employed in the present invention can be any of numerous surfactants or wetting agents, such as amino methyl propanol (AMP); an alkylaryl polyether alcohol, sulfonate or sulfate; sodium lauryl sulfate; potassium tripolyphosphate (KTPP); or alkylphenoxy poly(oxyethylene) ethanol. Amino methyl propanol has been found especially useful. When added in an amount of about 0.5% by weight of the ink, the surfactant has been found to give very good results. Most pigments are supplied in a dry powder form. In this state the particles cling together, hundreds and thousands of them. A surfactant, also called a wetting agent, promotes wetting of the pigment particles by the solvent (water in this case) so that they may be dispersed and not stick back together again. The surface tension of the final product is partially determined by the amount and type of surfactant.

Any desired fungicide can be added in a small amount sufficient to prevent bacterial action which could destroy the organic binder causing the ink to become putrid, watery, and valueless. The fungicide is added in the amounts generally known to the art to be effective for controlling bacterial action and usually about 0.2% by weight of the ink is an effective amount, but this can be varied according to conditions to be encountered if desired. Any well-known fungicide which is compatible with the pigment and binder can be used herein, for instance, an organic mercurial compound such as di(phenyl mercury) dodecenyl succinate; a phenolic compound, such as carbolic acid (phenol); or 1(3 chloroallyl)3,5,7 triaza-1 azonia-adamantane chloride.

DETAILED DESCRIPTION OF THE INVENTION

The pigment material may, as said, be any of the water-insoluble pigments, such as iron oxides, chromic oxide, carbon black, ultramarine blue, organic pigments, metallic pigments, nacreous or pearlescent pigments, and luminescent pigments. The pigment should be substantially uniform in size and finely dispersed, as described above.

The finely divided pigments, binder, surfactant and fungicide, are mixed and dispersed with stirring in the indicated amount of water. The uniform dispersion so prepared is suitably filled into small plastic squeeze bottles having feeder tops which are capped for shipping and storing. In use, the suspension is first thoroughly shaken or mixed to restore settled solids to uniform suspension. Then the cap is removed, and the feeder tip is placed within the blades of a ruling pen, for instance. Then the bottle is gently squeezed to feed the desired amount of ink to the pen. A brush can alternatively be used, by feeding, or by dipping into the suspension.

The following Examples will illustrate the composition of this invention and are to be considered illustrative only and not limitative.

All of the pigments used in Examples 1 to 6 have a particle size under 1 micron, lying in the range of 0.1 to 1.0 microns. In the Examples, AMP represents amino methyl propanol.

EXAMPLE 1

| Blue Ink | Parts by Weight |
| --- | --- |
| Ultramarine blue (sodium aluminum sulfosilicate) | 5.8 |
| Burnt umber (calcined raw umber which is naturally occurring pigment composed essentially of hydrated iron oxide, manganese oxide and clay minerals) | 1.9 |
| Titanium dioxide | 4.0 |
| Hydroxy ethyl cellulose | 2.5 |
| Surfactant AMP | 0.5 |
| Fungicide (di(phenyl mercury) dodecenyl succinate | 0.3 |
| Water | 85.0 |
| Total | 100.0 |

EXAMPLE 2

| Green Ink | Parts by Weight |
| --- | --- |
| Green chromic oxide | 3.8 |
| Raw umber | 6.2 |
| Titanium dioxide | 3.7 |
| Hydroxy ethyl cellulose | 2.5 |
| Surfactant AMP | 0.5 |
| Fungicide | 0.3 |
| Water | 83.0 |
| Total | 100.0 |

EXAMPLE 3

| Buff Ink | Parts by Weight |
| --- | --- |
| Raw umber | 5.7 |
| Yellow iron oxide (hydrated ferric oxide) | 3.8 |
| Red iron oxide (ferric oxide) | 1.0 |
| Titanium dioxide | 2.5 |
| Hydroxy ethyl cellulose | 2.5 |

-continued

| Buff Ink | |
|---|---|
| | Parts by Weight |
| Surfactant AMP | 0.5 |
| Fungicide | 0.3 |
| Water | 83.7 |
| Total | 100.00 |

EXAMPLE 4

| Grey Ink | |
|---|---|
| | Parts by Weight |
| Black iron oxide (ferro-ferric oxide) | 1.9 |
| Raw umber | 7.6 |
| Titanium dioxide | 3.2 |
| Hydroxy ethyl cellulose | 2.5 |
| Surfactant AMP | 0.5 |
| Fungicide | 0.3 |
| Water | 84.0 |
| Total | 100.00 |

EXAMPLE 5

Two other inks are made exactly as in Example 1 except that instead of hydroxy ethyl cellulose binder there is substituted in one ink methyl cellulose, and in the second ink carboxy methyl cellulose, as binder. The inks each performed very well in drawing lines on mat paper.

EXAMPLE 6

| Black Ink | |
|---|---|
| | Parts by Weight |
| Carbon black | 2.8 |
| Hydroxy ethyl cellulose | 2.8 |
| Surfactant AMP | 0.5 |
| Fungicide | 0.3 |
| Water | 93.6 |
| Total | 100.00 |

EXAMPLE 7

| Gold Ink | |
|---|---|
| | Parts by Weight |
| Bronze pigment | 6.7 |
| Hydroxy ethyl cellulose | 4.0 |
| Fungicide | 0.3 |
| Water | 89.0 |
| Total | 100.00 |

The pigment used in Example 7 to produce a gold ink is a paste of non-tarnishing bronze powder, 95% passing through 325 mesh, the particles being flat flakes about 4 microns in thickness and about 40 microns in width and spreading 4300 sq.cm/gram when evenly dispersed on water. The paste also contains a small amount of water and a small and sufficient amount of surfactant. The fungicide can be any of those shown above.

Each of the inks of the above Examples has been applied to unglazed mounting boards or picture mats by means of a ruling pen and has provided clean, uniform lines for framing.

I claim:

1. An ink for ruling pens for direct use on unglazed paper surface including cardboard picture mats, consisting essentially of the following components:
   (a) from 2.8 to 13.7% by weight of opaque water-insoluble pigment of particles passing through a 325 mesh sieve and said particles being of from 0.1 to 5.0 micron size in at least one dimension,
   (b) from 2.5 to 4% by weight of an organic binder, adapted to bind said particles together and to said surfaces and to form a flexible film upon drying,
   (c) a small but effective amount of a surfactant sufficient to effect wetting of the pigment by water and dispersion therein,
   (d) a small but effective amount of fungicide sufficient to prevent bacterial degradation of said organic binder, and
   (e) water to make 100% by weight and to form said ink having a surface tension of from 50 to 60 dynes per cm, to provide an opaque ink,
   (f) the viscosity of said ink being adjusted so that the pigment holds in said pen while the ink is being used; and the surface tension and viscosity being so adjusted as to determine the rheological properties of said ink so that an adequate charge of said ink will hold in the pen without dripping out while the ink will flow out of said pen readily when a line is being drawn; and said ink will not spread and feather out when applied to a porous paper surface.

2. An ink as in claim 1 wherein said particles are predominantly of uniform sizes between 0.5 and 5.0 microns.

3. An ink as in claim 1 wherein said particles are flat metallic flakes of from 0.1 to 5 microns thickness.

4. An ink as in claim 3 wherein said particles are non-tarnishing bronze flakes.

5. An ink for ruling pens for direct use on unglazed paper surface including cardboard picture mats, consisting essentially of the following components:
   (a) from 2.8 to 13.7% by weight of opaque, water-insoluble pigment of particle sizes predominantly in the range of from 0.1 to 5 microns,
   (b) from 2.5% to 4% by weight of an organic binder, adapted to bind said particles together and to said surfaces and to form a flexible film upon drying,
   (c) a small amount of surfactant effective to cause wetting and dispersion of said pigment in water,
   (d) a small amount of fungicide sufficient to prevent bacterial degradation of said binder, and
   (e) water to make 100% by weight and to form said ink having a surface tension of from 50 to 60 dynes per cm, to provide an opaque ink,
   (f) the viscosity of said ink being such that the pigment holds in said pen while the ink is being used; and the surface tension and viscosity being such as to determine the rheological properties of said ink so that an adequate charge thereof will hold in the pen without dripping out while the ink will flow out of said pen readily when a line is being drawn; and said ink will not spread and feather out when applied to a porous paper surface.

6. An ink as in claim 5 wherein said pigment is at least one substance chosen from the group consisting of iron oxides, chromic oxide, carbon black ultramarine blue, raw umber, burnt umber, and titanium dioxide.

7. An ink as in claim 5 wherein said binder is chosen from the group consisting of hydroxy ethyl cellulose, methyl cellulose and carboxy methyl cellulose.

8. An ink as in claim 5 wherein said binder is hydroxy ethyl cellulose.

9. An ink as in claim 8 wherein said hydroxy ethyl cellulose is present in an amount of 2.5% by wt.

10. An ink as in claim 5 wherein said binder is methyl cellulose.

11. An ink as in claim 5 wherein said binder is carboxy methyl cellulose.

12. An ink as in claim 5 wherein said surfactant is amino methyl propanol.

13. An ink as in claim 5 wherein said surfactant is present in an amount of about 0.5%.

14. An ink as in claim 5 wherein said fungicide is present in an amount of about 0.2%.

15. An ink as in claim 5 wherein said fungicide is di(phenyl mercury) dodecenyl succinate.

* * * * *